(12) United States Patent
Surmi et al.

(10) Patent No.: US 12,209,801 B2
(45) Date of Patent: Jan. 28, 2025

(54) SYSTEM AND METHOD FOR THE PROCESSING OF LNG

(71) Applicant: Petroliam Nasional Berhad (PETRONAS), Kuala Lumpur (MY)

(72) Inventors: Amiza Surmi, Kuala Lumpur (MY); Fadhli Hadana Rahman, Kuala Lumpur (MY); Zamzila Kassim, Kuala Lumpur (MY); Radin Suhaib Salihuddin, Kuala Lumpur (MY); M Yazid Jay Jalani, Kuala Lumpur (MY); M Syazwan M Shukor, Kuala Lumpur (MY); Nurzatil Aqmar Othman, Kuala Lumpur (MY); Liyana Salwa M Nazir, Kuala Lumpur (MY); Ahmad Syukri Na'Im, Kuala Lumpur (MY)

(73) Assignee: Petroliam Nasional Berhad (PETRONAS), Kuala Lumpur (MY)

( * ) Notice: Subject to any disclaimer, the term of this patent is extended or adjusted under 35 U.S.C. 154(b) by 371 days.

(21) Appl. No.: 17/622,334

(22) PCT Filed: Jun. 24, 2020

(86) PCT No.: PCT/MY2020/050045
§ 371 (c)(1),
(2) Date: Dec. 23, 2021

(87) PCT Pub. No.: WO2020/263076
PCT Pub. Date: Dec. 30, 2020

(65) Prior Publication Data
US 2022/0252342 A1 Aug. 11, 2022

(30) Foreign Application Priority Data
Jun. 25, 2019 (MY) .............................. PI2019003692

(51) Int. Cl.
*F25J 3/02* (2006.01)
*B01D 45/14* (2006.01)
*B01D 53/24* (2006.01)

(52) U.S. Cl.
CPC ............ *F25J 3/0266* (2013.01); *B01D 45/14* (2013.01); *F25J 3/0214* (2013.01); *F25J 3/0257* (2013.01);
(Continued)

(58) Field of Classification Search
CPC .............. B01D 45/14; B01D 2257/504; B01D 2256/245; F25J 3/0209; F25J 3/0266
See application file for complete search history.

(56) References Cited

U.S. PATENT DOCUMENTS

| | | |
|---|---|---|
| 3,643,452 A | 2/1972 | Ruhemann et al. |
| 4,872,530 A | 10/1989 | Burgess |

(Continued)

FOREIGN PATENT DOCUMENTS

| | | |
|---|---|---|
| CN | 101163934 A | 4/2008 |
| WO | WO-2006087332 A1 | 8/2006 |

(Continued)

*Primary Examiner* — Eric S Ruppert
(74) *Attorney, Agent, or Firm* — Bradley Arant Boult Cummings LLP

(57) ABSTRACT

A system for processing an LNG feed, the system comprising: a bulk removal stage arranged to remove and release $CO_2$ liquid from the inflow feed, said bulk removal stage including a first HGMT device, and; a polishing stage arranged to receive a lean $CO_2$ feed from the first HGMT device, said polishing stage arranged to remove and release residual $CO_2$, the polishing stage including a second HGMT device; wherein the polishing stage is arranged to release an outflow of $CO_2$ stripped LNG.

8 Claims, 4 Drawing Sheets

(52) U.S. Cl.
CPC ........ *B01D 53/24* (2013.01); *B01D 2257/504* (2013.01); *F25J 2205/10* (2013.01); *F25J 2210/62* (2013.01); *F25J 2220/62* (2013.01); *F25J 2220/66* (2013.01)

(56) References Cited

U.S. PATENT DOCUMENTS

| | | | |
|---|---|---|---|
| 2006/0225386 A1* | 10/2006 | Brouwers | C10L 3/102 |
| | | | 55/319 |
| 2009/0301296 A1* | 12/2009 | Hoijtink | B01D 19/0052 |
| | | | 95/35 |
| 2017/0225101 A1 | 8/2017 | Schlichter et al. | |

FOREIGN PATENT DOCUMENTS

| | | | | |
|---|---|---|---|---|
| WO | WO-2010052299 A1 | | 5/2010 | |
| WO | WO-2015147640 A1 | * | 10/2015 | ......... B01D 17/0217 |
| WO | WO-2016064265 A1 | | 4/2016 | |

* cited by examiner

SYSTEM AND METHOD FOR THE PROCESSING OF LNG

FIELD OF THE INVENTION

The invention relates to the processing of LNG from a production field. In particular, the invention relates to the removal of adverse gases including $CO_2$, $H_2S$ and $N_2$ from a field originating feed stream

BACKGROUND

In order to manage the low quality of natural gas for a field, which is laden with impurities such as high $CO_2$, $H_2S$ and $N_2$, typically requires a complex cryogenic separation process the separation to meet product specifications. Cryogenic separation is normally associated with tall column and heavy weight to meet the separation target of sales gas/LNG specs.

Alternatively, solvent-based removal processes for pretreatment of nitrogen involve high energy consumption.

Both such processes require high CAPEX, OPEX, weight and footprint when applied to offshore conditions.

SUMMARY OF INVENTION

In a first aspect, the invention provides a system for processing an LNG feed, the system comprising: a bulk removal stage arranged to remove and release $CO_2$ liquid from the inflow feed, said bulk removal stage including a first HGMT device, and; a polishing stage arranged to receive a lean $CO_2$ feed from the first HGMT device, said polishing stage arranged to remove and release residual $CO_2$, the polishing stage including a second HGMT device; wherein the polishing stage is arranged to release an outflow of $CO_2$ stripped LNG.

In a second aspect, the invention provides a method for processing an LNG feed, the method comprising the steps of: separating and releasing $CO_2$ liquid from the inflow feed using a first HGMT device; receiving a lean $CO_2$ feed from the first HGMT device at a second HGMT device; polishing said lean $CO_2$ feed and releasing residual $CO_2$ using the second HGMT device, and; releasing an outflow of $CO_2$ stripped LNG.

In a third aspect, the invention provides a system for processing an LNG feed, the system comprising: an $N_2$ removal stage arranged to remove and releasing $N_2$ liquid from the inflow feed, said $N_2$ removal stage including an $N_2$ separation HGMT device, and; wherein the $N_2$ separation HGMT device is arranged to release an outflow of $N_2$ stripped LNG.

The development of both $CO_2$ and $N_2$ separation technologies will enable the monetisation of undeveloped gas fields having a high level of impurities. However, relying upon high cost, and large footprint, processes such as column distillation lessen the economic and technical viability of such fields.

High gravity mass transfer (HGMT) devices solve that part of the process, but the incorporation of HGMT devise so as to optimise the removal of such impurities remains key. HGMT devices eliminate the need for solvent based processes for conventional acid gas removal, as well as the necessity for excessive pre-cooling prior to entering the cryogenic process, as well as the requirement for additional dehydration units for pre-treatment, particularly for $N_2$ removal.

BRIEF DESCRIPTION OF DRAWINGS

It will be convenient to further describe the present invention with respect to the accompanying drawings that illustrate possible arrangements of the invention. Other arrangements of the invention are possible and consequently, the particularity of the accompanying drawings is not to be understood as superseding the generality of the preceding description of the invention.

DETAILED DESCRIPTION

Figure 1:
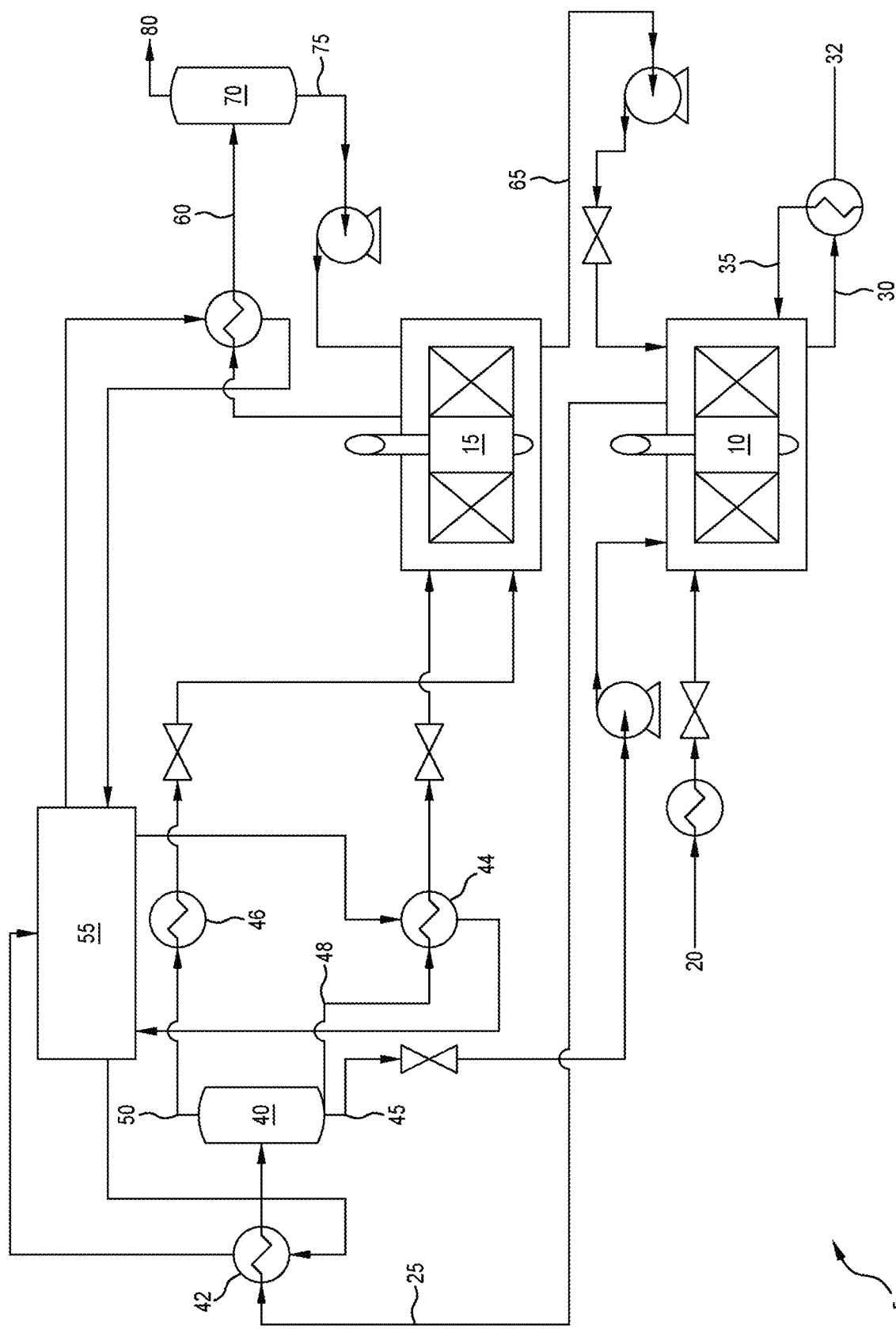
FIG. 1 is a schematic view of a $CO_2$ removal system according to one embodiment of the present invention.

FIG. 1 shows a schematic view of a $CO_2$ removal system 5 according to one embodiment of the present invention. The system 5 receives an inflow of a feed stream From natural gas stream, which may, for instance have more than 40% $CO_2$ content, less than 15% $N_2$ and including a portion of $H_2S$. This is delivered to a high gravity mass transfer device 10 which in this case forms the basis for a bulk removal and polishing stage. The intention of the first HGMT 10 is to remove the majority of $CO_2$ and $H_2S$ from the feed stream 20, to release 32 liquid $CO_2$ from an outlet 30 in the HGMT 10. This first bulk removal may represent from 90 to 95% of the $CO_2$ present in the feed stream. Meanwhile, stream 35 returned to HGMT 10 to further refine the bulk removal stage. The feed stream having lean $CO_2$ is then directed 25 to a polishing stage having a second HGMT 15. The feed 25 may release a maximum of 14% $CO_2$, and a proportionally increased $N_2$ component. The feed 25 is cooled by a heat exchanger 42 and passed to a reflux vessel 40 in which the liquid $CO_2$ is returned 45 to HGMT 10. A portion 48 of the liquid is cooled and expanded in a heat exchanger 44 to a lower pressure prior to passing to an upper section of second HGMT 15. Meanwhile, the lean-$CO_2$ vapour 50 will heat up in a further heat exchanger 46 and expand before entering lower section of HGMT 15. HGMT 15 must always operate at lower pressure than HGMT 10 however at maximum operating pressure of 40 bar.

Residual $CO_2$ is removed from the feed stream and returned 65 to the first HGMT 10 via pump for the hydrocarbon recovery from HGMT 15. Stream 65 rich in CO2 introduces to the HGMT 10 will avoid solid $CO_2$ solid region.

The polished feed stream having the substantial $CO_2$ component removed therefrom is directed and cooled 60 to a vessel 70. The liquid 75 will be pump back to HGMT 15 to further enhance the separation. The $CO_2$ lean stream 80 contains minimal $CO_2$ content of at least 50 ppm with a proportionally increased $N_2$ content in hydrocarbon rich stream.

In this further embodiment, the polishing stage receives the feed stream under cryogenic conditions, although cryogenic conditions used in this embodiment is slightly different than conventional definition cryogenic conditions. To this end, a refrigeration unit 55 which may use for instance liquid nitrogen is directed to the heat exchangers leading into the HGMT 15 to cool down the process streams to meet the cryogenic operating conditions.

Figure 2:
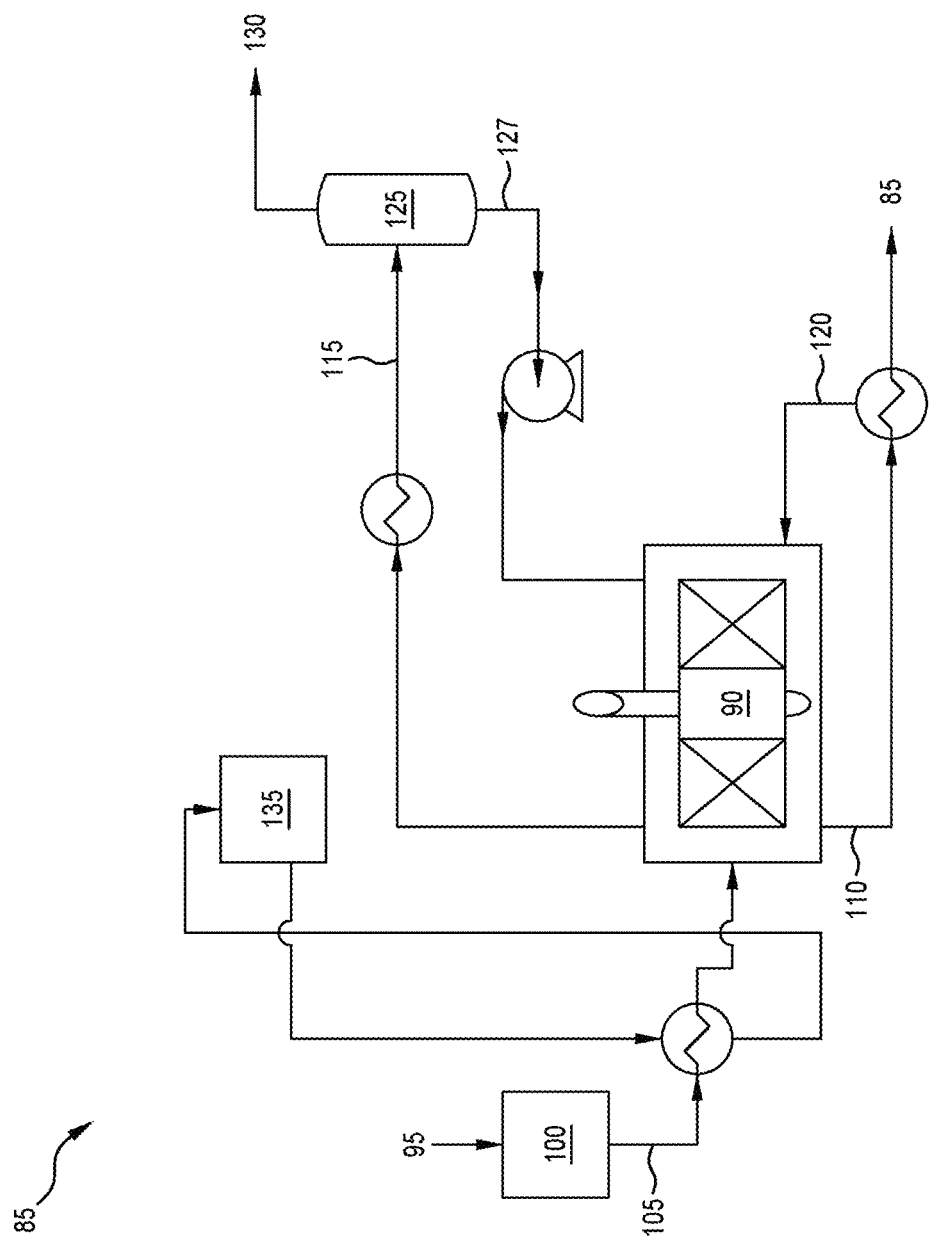
FIG. 2 is a schematic view of an $N_2$ removal system according to a further embodiment of the present invention.

FIG. 2 shows a further aspect of the present invention whereby an N2 removal stage 85 includes an HGMT device 90 for receiving a feed stream 95 that is nitrogen laden. The nitrogen laden gas passes through a preconditioning stage 100, to cool down the stream 105 temperature to the cryogenic temperature of −60° C. to −120° C., into the HGMT device 90. The HGMT device 90 according to this embodiment, has been modified, in that internal housing elements, rotating parts, apparatus to avoid flow maldistribution, etc., have been modified from conventional HGMT devices, so as to meet the low temperature condition and produce on-spec LPNG product.

A separator vessel 125 is separates a vapour component 130 and liquid component 127. A nitrogen rich stream containing at least 97% nitrogen is drawn off from overhead the vessel 125. The liquid component 127 is passed to HGMT device 90 via pump to further enhance the liquid outflow 110 which contains mostly liquid hydrocarbon with very minimal $CO_2$ and $N_2$ content. This component passes through a heat exchanger and is drawn off 85 as the LNG product. A return 120 stream is directed back to the HGMT device 90 for further separation.

Figure 3:
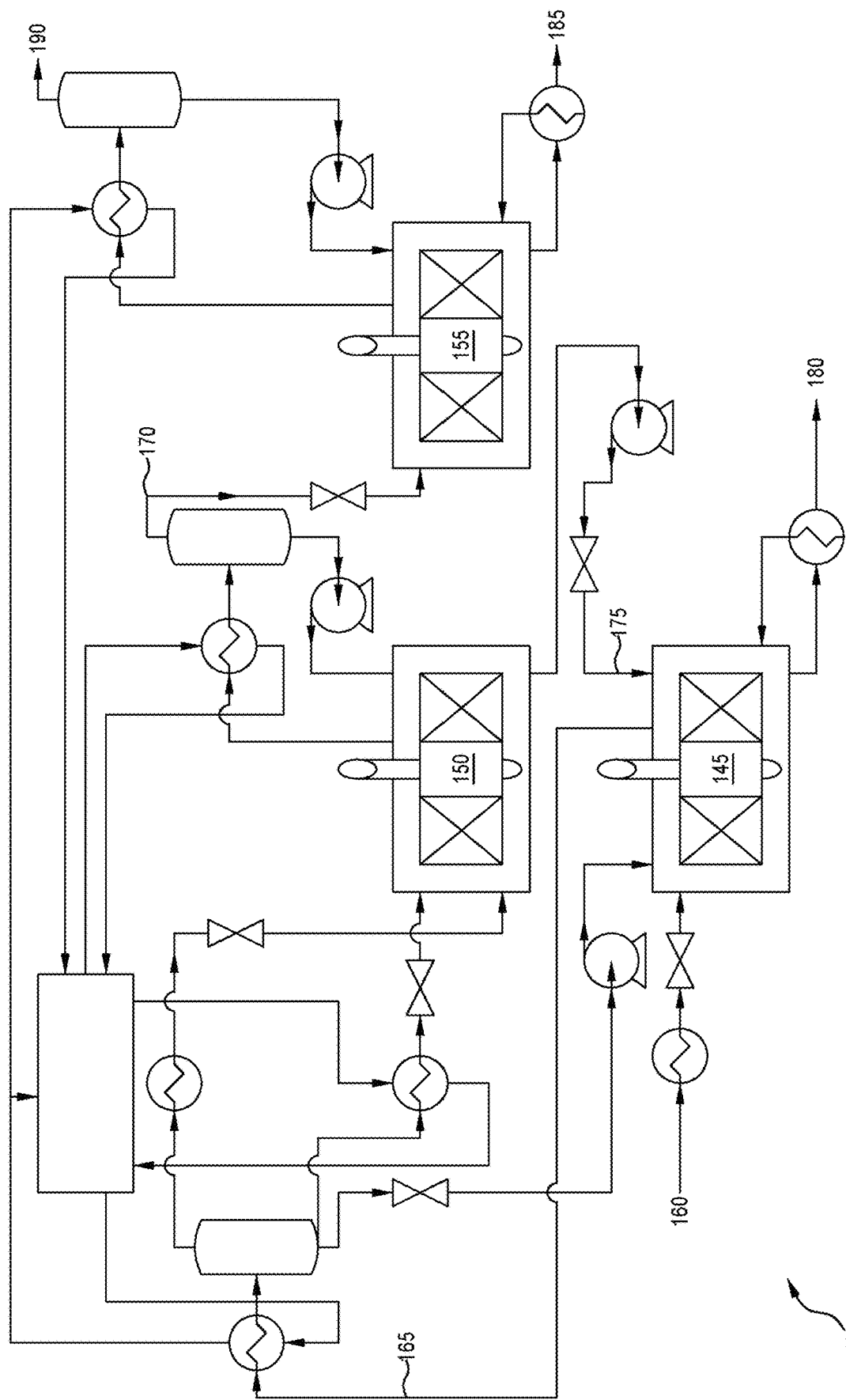
FIG. 3 is a schematic view of a combined $CO_2$ and $N_2$ removal system according to a further embodiment of the present invention.

FIG. 3 shows a system 140 of an integrated HGMT process for $CO_2$ and $N_2$ removal from natural gas to LNG production. The integrated system 140 combines a multi stage separation process whereby a feed stream 160 is passed into the HGMT 145 for bulk removal of $CO_2$ and subsequent disposal of liquid $CO_2$ rich stream 180 with minimal hydrocarbon content. The lean $CO_2$ stream from the HGMT 145 is directed 165 to the second polishing stage of the second HGMT 150 to meet the utmost $CO_2$ content of 50 ppm in the 170 stream. A proportionally increased of $N_2$ content in stream 170 is directed to a third HGMT 155 for the nitrogen removal to produce LNG product of stream 185 (contains less than 1% of nitrogen). Furthermore, the nitrogen rich gas stream 190 is drawn off at the overhead section of HGMT 155.

This invention can be further employed to meet the nitrogen content in the fuel gas stream for the self-consumption with minimal impact to LNG production.

Figure 4:
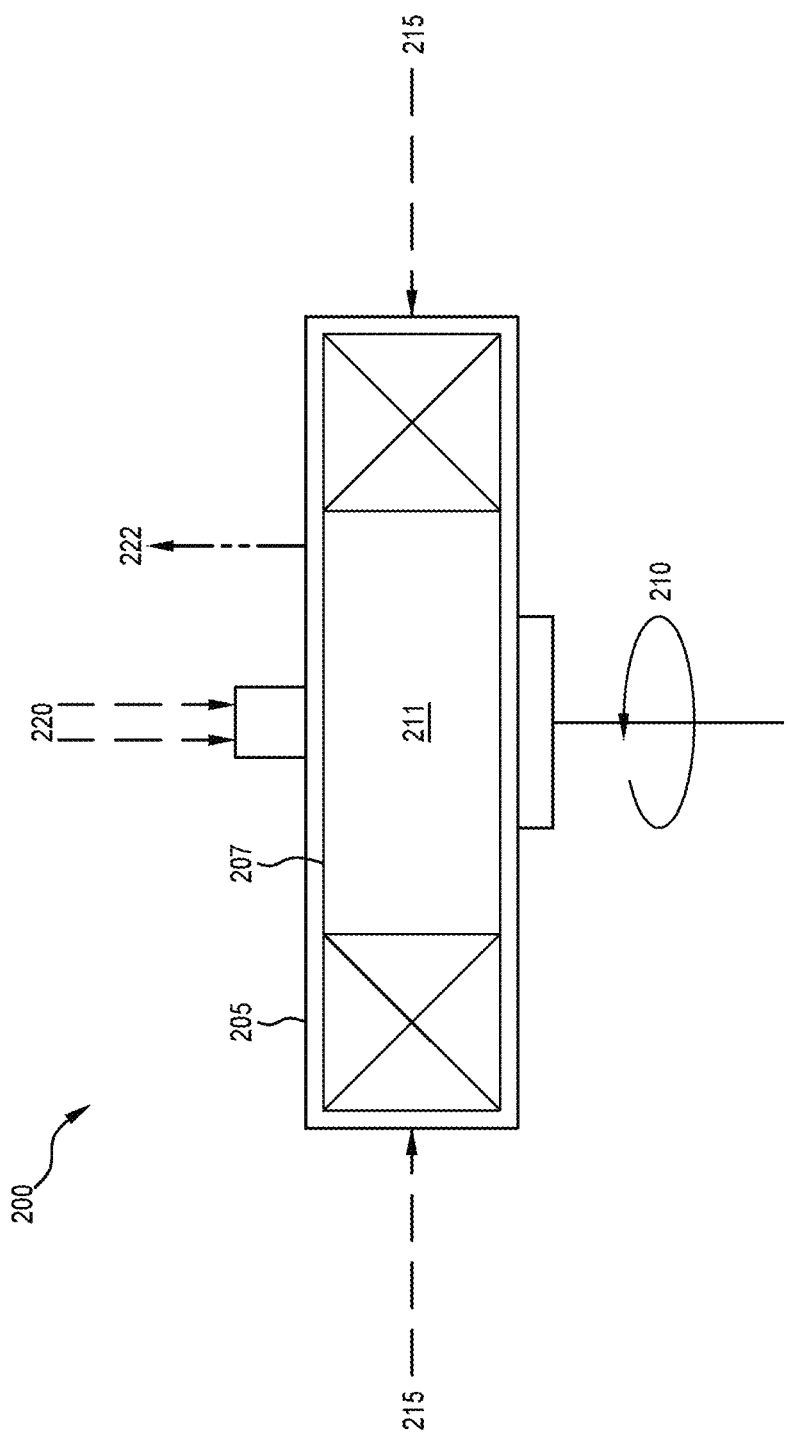
FIG. 4 is a schematic view of a generalised high gravity mass transfer device according to a further embodiment of the present invention.

FIG. 4 shows a generalized view of an HGMT device 200 comprising a high gravity mass transfer device housing which includes a rotational part 207, an internal cavity 211 for an arranged elements to enhance contact area for gas and liquid phases and one or more quantity apparatus can be installed in the housing to minimise the flow maldistribution inside the HMGT device.

Two phase feed stream 215 is introduce into a chamber 205 having a rotating elements 207. The arranged elements experienced the rotational movement resulting in high centrifugal force producing smaller liquid droplets amplified the mass transfer and heat transfer with higher overall separation efficiency and shorter residence time. Under this condition, most of the gas will be diverted to centre of the arranged elements due to the difference in velocity and drawn off at the overhead section 222 of HGMT device.

Meanwhile, liquid product stream 224 is produced at the bottom section of HGMT device. A liquid stream 220 from an overhead vessel is diverted back to HGMT device to assist the separation process.

The invention claimed is:

1. A system for processing a feed stream of natural gas, the system comprising:
   a bulk removal stage arranged to remove and release $CO_2$ liquid from the feed stream and release a lean $CO_2$ feed, said bulk removal stage including a first high gravity mass transfer (HGMT) device;
   a first heat exchanger arranged to receive a liquid portion of the lean CO2 feed, said first heat exchanger arranged to cool and expand said liquid portion to a lower pressure;
   a second heat exchanger arranged to receive a vapour portion of the lean $CO_2$ feed, said second heat exchanger arranged to heat and expand said vapour portion; and
   a polishing stage arranged to receive the cooled and expanded liquid portion and the heated and expanded vapour portion of the lean $CO_2$ feed, said polishing stage arranged to remove and release residual $CO_2$, the polishing stage including a second HGMT device;
   wherein the polishing stage is arranged to release an outflow of $CO_2$ stripped natural gas.

2. The system according to claim 1, wherein the second HGMT device is further arranged to separate and direct a portion of the $CO_2$ stripped natural gas to the first HGMT device.

3. The system according to claim 1, further including a refrigeration system for cooling the inflow from the bulk removal stage prior to entering the second HGMT device.

4. The system according to claim 1, further including a reflux vessel for separating a portion of the feed stream from the bulk removal stage and re-directing the $CO_2$ liquid to the first HGMT device before entering the polishing stage.

5. A system for processing a feed stream of natural gas, the system comprising:
   the bulk removal stage and the polishing stage according to claim 1; and
   wherein said polishing stage is arranged to release an outflow of $CO_2$ stripped natural gas to an $N_2$ removal stage.

6. The system according to claim 5, wherein said $N_2$ removal stage arranged to remove and releasing $N_2$ gas stream from the $CO_2$ stripped natural gas, said $N_2$ removal stage including an $N_2$ separation HGMT device, and wherein the $N_2$ separation HGMT device is arranged to release an outflow of $N_2$ stripped natural gas.

7. The system according to claim 1, wherein the second HGMT device is further arranged to separate and direct a portion of the $CO_2$ stripped natural gas to the first HGMT device.

8. The system according to claim 1, wherein each of the first and second HGMT devices comprises a chamber forming an internal cavity that houses rotating elements.

* * * * *